March 11, 1941. H. V. FRIEDMAN 2,234,372
REFRIGERATING APPARATUS
Filed Feb. 11, 1939
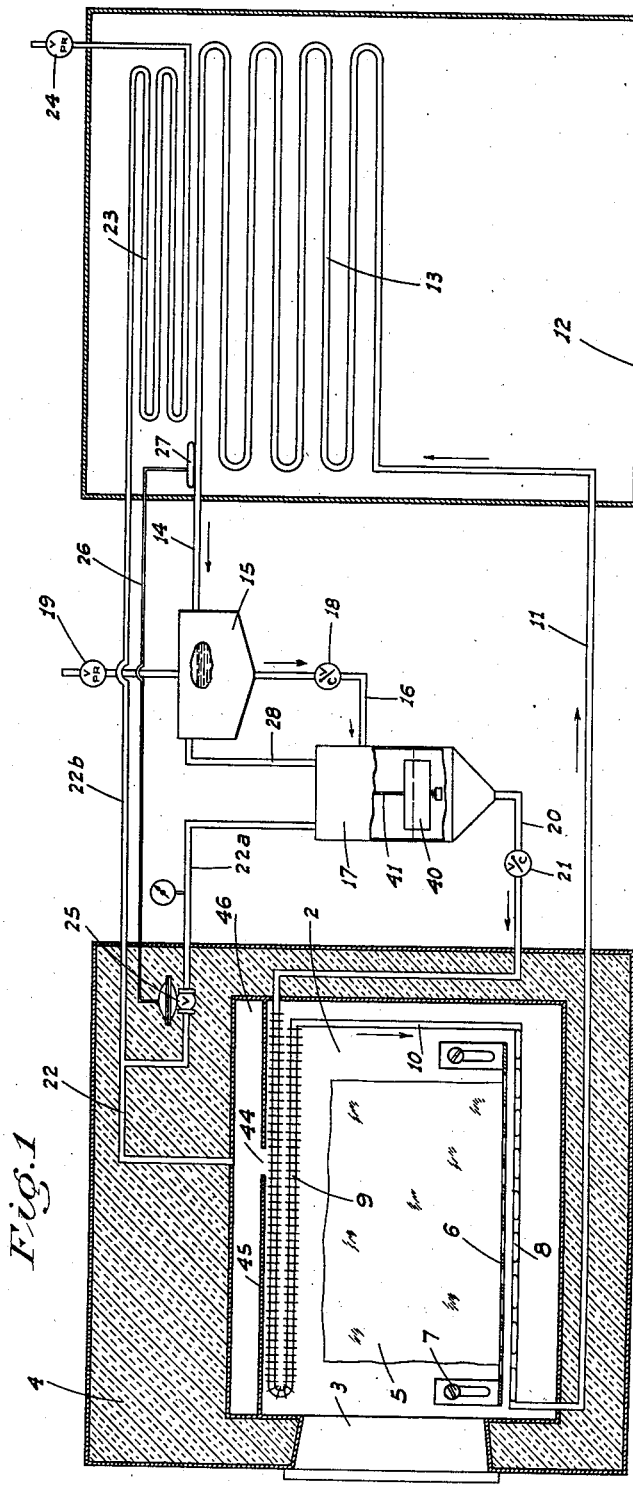
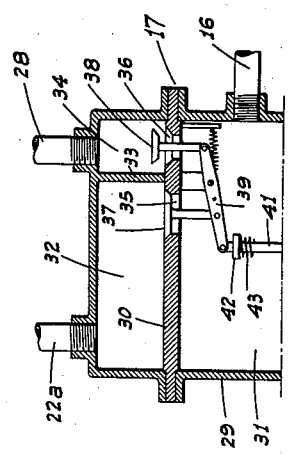
INVENTOR
H. V. Friedman
ATTORNEY Patented Mar. 11, 1941

2,234,372

UNITED STATES PATENT OFFICE 2,234,372

REFRIGERATING APPARATUS

Harold V. Friedman, Las Vegas, Nev., assignor of one-half to Alma M. Friedman, Dallas, Tex.

Application February 11, 1939, Serial No. 255,950

5 Claims. (Cl. 62—91.5)

This invention relates in general to improved refrigerating apparatus for commercial or domestic use, and in particular the invention is directed to an improvement in that type of refrigerating apparatus in which a low temperature substance such as solidified carbon dioxide is used as the cooling medium, and which substance is characterized by the fact that it sublimates during the heat exchange process. For the purpose of this specification, such substances will be referred to as "dry ice."

Solidified gas has been already widely used for refrigeration, and one known application is that of placing the dry ice directly in the space to be refrigerated, and allowing the process of sublimation to continue as long and at such rate as heat is supplied from the surroundings by radiation and convection. To promote more uniform temperature control, forced circulation of air over the refrigerant has been used. Other devices, such as setting up gravity air circulation over the refrigerant in an upper chamber to cool a space in a lower chamber, and the use of variable dampers and orifices to control the circulation have been used. In an effort to provide greater control over the rate of sublimation and consequent refrigeration, liquids of a volatile nature have been condensed and re-evaporated through a system of refrigerant piping, with dry ice as the primary medium. The obvious difficulty with most applications of dry ice to date has been either a lack of adequate control over the rate and intensity of the refrigeration, or an over complication of thermostatic appliances which do not function well at the very low temperatures that exist in the dry ice system.

However, due to its desirable refrigerating qualities, there is a demand for the application of dry ice refrigeration in perishable produce transporting vehicles, and the like.

It is therefore one object of this invention to provide dry ice refrigerating apparatus which includes a system which is self-operating, positive and reliable, free from complication, and yet highly efficient; efficiency being an essential due to the relatively high cost of production of the dry ice.

Another object of the invention is to provide a refrigerating apparatus of the type described wherein is included a closed cooling coil system arranged in unique combination with a dry ice heat exchange system; the gas resulting from the sublimation of the dry ice being held under pressure and used to circulate a liquid in the cooling coil system.

Another object of the invention is to provide novel means to accomplish heat transfer from the liquid in the cooling coil system to the gas produced by the sublimation of the dry ice; such heat transfer being accomplished at a point immediately below the body of refrigerant as well as at a point thereabove so as to assure maximum efficiency.

A further object is to control the rate of sublimation of the dry ice, and the consequent refrigerating or heat exchange activity, by regulating the gas pressure in the insulated chamber containing the dry ice, and by providing means to vary the distance between the body of dry ice and adjacent portion of the cooling coil system.

It is also objects of the invention to provide positive and yet safe means for the expansion and contraction of the liquid in the cooling coil system and without entry of outside air or the production of a vacuum; and to provide for the venting of any excess gas pressure from the dry ice heat and exchange system whereby to avoid damage to the apparatus.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views:

Figure 1 is a diagrammatic elevation of the apparatus.

Figure 2 is an enlarged, fragmentary elevation, in section, of the gas actuated intermittent flow pump in the cooling coil system.

Referring now more particularly to the characters of reference on the drawing, the numeral 1 indicates a container formed with an internal chamber 2, there being a gas tight door 3 which permits access to the chamber. The area between the chamber 2 and container 1 is heavily insulated as at 4. A cake 5 of dry ice is supported in the chamber, in spaced relation to the walls thereof, on a perforate platform 6; this platform being mounted, as at 7, for vertical adjustment. If desired, mechanism may be incorporated to effect such vertical adjustment from exteriorly of container 1.

A horizontally disposed heat exchange coil 8 is mounted in the chamber 2 below the perforate platform 6, while another heat exchange coil 9, of the fin type is disposed in the chamber above the cake of dry ice; these two coils being connected together at one end by a pipe 10. The other end of the lower coil 8 is connected with a pipe 11 which leads out of container 1 into the ice box 12 or like enclosure whose interior is to be cooled; a heat exchange coil 13 being mounted in the box 12 and connected at one end with pipe 11, while the other end of coil 13 is connected with a pipe 14 leading out of box 12 and discharging into an enclosed expansion tank 15 and at a point adjacent the top thereof.

A pipe 16 extends from the bottom of the tank 15 to the gas actuated intermittent flow pump, indicated generally at 17, and a check valve 18 is interposed in such pipe 16 and opens toward the pump 17. A pressure relief valve unit 19 connects with the top of the expansion tank and opens to the atmosphere. The pump 17 is in the nature of a pulsometer and will be described in detail hereinafter. A return line or pipe 20 extends from the bottom of pump 17 to the remaining end of the upper coil 9 in chamber 2; there being a check valve 21 in pipe 20 and opening towards coil 9.

A gas delivery pipe 22 communicates at one end with the top of chamber 2 in container 1 and leads therefrom to a Y 22; one branch 22a being connected into the top of pump 17, while the other branch 22b enters box 12 and is connected with a supplementary heat exchange coil 23 mounted therein. The other end of coil 23 extends out of the box 12 and is there provided with a pressure relief valve 24 which opens to the atmosphere. The branch 22a has a thermostatic valve 25 interposed therein and controlled by means of an extension tube 26 which runs into box 12 and is there provided with a thermostat unit 27 associated with heat exchange coil 13. A pipe 28 enters the top of the pump in spaced relation to pipe 22a and leads to connection with expansion tank 15 adjacent the top and in substantially the same plane as pipe 14.

In detail the gas actuated pump 17 comprises a housing or tank 29 which is formed with an internal horizontal partition 30 disposed adjacent but spaced from the top of the tank; the interior of the housing thus being separated into a relatively large lower chamber 31 and a small upper chamber 32. A transverse wall 33 in the upper chamber forms a separate gas chamber 34. Pipe 22a is in communication with chamber 32 and pipe 28 leads into chamber 34.

Parts 35 and 36, provided with upwardly opening valves 37 and 38 respectively, are formed in partition 30 and provide for controlled communication between upper chambers 32 and 34, and lower chamber 31. The valve 37 is opened and valve 38 closed simultaneously, or vice versa, by means of a snap action lever unit 39 which is actuated by a float 40 which is slidably mounted on a rod 41 which depends into the lower chamber from pivotal connection with one end of the lever unit 39. Stops 42 and shock absorbing springs 43 on the end portions of the rod limit the amount of vertical movement of the float. As clearly shown in Fig. 2, pipe 16 from expansion tank 15 enters the side of the pump housing below but adjacent partition 30.

Operation

In use the container 1 as well as expansion tank 15 and pump 17 may be disposed at a point remote from box 12. For example, box 12 may be the enclosed body of a motor vehicle while the container 1, etc., may be mounted on the under frame or the like and thus does not occupy valuable space in the cooled or refrigerated body.

The refrigerating process is as follows:

As the cake 5 of dry ice sublimates, the intensely cold gas falls to the bottom of chamber 2 where it effects a heat transfer from the liquid in coil 8 and which liquid is being intermittently circulated through this coil and into the coil 13 in box 12 as will hereinafter appear. After the initial heat exchange at coil 8, the gas then rises about the sides of the cake 5 of dry ice and passes over the upper coil 9 effecting a further heat exchange. As the liquid in the cooling coil system enters coil 9 first and then drops to coil 8, the heat exchange at coil 9 is, in effect, a precooling operation.

After passing upward over coil 9, the rising gas in chamber 2 passes through an orifice 44 in a horizontal baffle plate 45 which is mounted in chamber 2 and assures a curtain of gas about the cake 5 and which curtain of gas serves as an insulation medium. The gas then accumulates under pressure in pocket 46 above baffle 45 and thence bleeds into pipe 22; a portion thereof passing through pipe 22, when valve 25 is open, into upper chamber 32 in the pump housing 29.

Liquid in the cooling coil system and specifically from the expansion tank 15 flows through pipe 16 into the lower chamber in pump housing 29 which causes float 40 to rise. As the float reaches the upper end of its limit of travel, the snap action lever unit 39 is tripped, opening valve 37 and closing valve 38. Thereupon gas under pressure flows from chamber 32 into chamber 31 forcing the liquid therein out through pipe 20, which causes a flow in coil 9, pipe 10, coil 8, and thence into pipe 11 and coil 13 in the box 12; an equal portion of liquid being discharged by pipe 14 into expansion tank 15. As the liquid is forced from the chamber 31, float 40 falls and as it reaches the bottom of the rod 41, it again trips unit 39 closing valve 37 and opening valve 38 so that the gas may escape from said chamber 31 and the latter may again fill with liquid and the pumping cycle be repeated.

While valve 38 is open the gas remaining in chamber 31 from the previous pumping operation is displaced through chamber 34 and pipe 28 into expansion tank 15 where it serves as an expansion compensating medium and prevents creation of vacuum and possible entry of air and moisture from the atmosphere into the apparatus. The spent gas in tank 15 escapes through check valve 19; said valve being set to open outwardly under normal operating pressure of the gas.

The frequency of the pumping cycle is controlled by valve 25 and which valve is actuated thermostatically from thermostat unit 27 which is set to effect opening of valve 25 upon a predetermined rise in temperature at the coil 13 in box 12. The portion of the gas from pipe 22 which is not passed through the pump assembly, as above, flows through pipe 22b and into coil 23 in box 12 where additional heat exchange is accomplished. Thereafter, such portion of gas is relieved into the atmosphere by pressure relief valve 24. In practice, all of the exposed pipes, both gas and liquid, will be adequately insulated against heat exchange.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. Refrigerating apparatus comprising, in combination, a chamber to be cooled, a separate gastight chamber adapted to receive a sublimatory refrigerant, a heat exchange coil system including a coil in each of said chambers, a refrigerating liquid in the system, a gas actuated pump interposed in the system, a gas feeding pipe leading directly from the refrigerant chamber to the pump, a valve interposed in said pipe between said refrigerant chamber and said pump, said valve being adapted to positively control the flow of gas through said pipe, and temperature responsive means associated with the coil in the chamber to be cooled and arranged to actuate said valve.

2. In refrigerating apparatus including a closed chamber adapted to receive a sublimatory refrigerant, means to support a quantity of said refrigerant in the chamber, and a heat exchange coil system disposed in part in said chamber, a fluid heat exchange medium in the system, and means to circulate said fluid; said part of the coil system including a pair of heat exchange coils connected in series and mounted in said chamber in vertically spaced relation, one coil being disposed above the space adapted to be occupied by the refrigerant and the other coil being disposed below said space, and a passage to vent the gas resulting from the sublimation of the refrigerant from the top of said chamber.

3. An apparatus as in claim 2 including a horizontal baffle mounted in the chamber some distance below the top thereof but above said one coil; said baffle forming a separate compartment at the top of the chamber, the baffle having an orifice therein between the chamber and said compartment.

4. Refrigerating apparatus comprising a chamber to be cooled, a separate gas tight chamber adapted to receive a sublimatory refrigerant, a heat exchange coil system including a coil in each of said chambers, a pulsometer type gas actuated pump interposed in said system intermediate said chambers, and expansion tank in the system ahead of the pump, a check valve in the system between the expansion tank and the pump and opening toward the latter, another check valve in the system beyond and opening away from the pump, a gas feeding pipe extending from the gas tight chamber to the pump, a valve in said pipe, and temperature responsive means associated with the coil in the chamber to be cooled and arranged to actuate said valve in the gas feeding pipe.

5. An apparatus as in claim 4 including another gas flow pipe extending between the pump and expansion tank, whereby the exhaust gas from the pump flows to said expansion tank, and an outwardly opening check valve arranged to vent said exhaust gas from the expansion tank at normal operating pressure but without permitting entry of air into the system.

HAROLD V. FRIEDMAN.